US008929614B2

(12) United States Patent
Oicherman et al.

(10) Patent No.: US 8,929,614 B2
(45) Date of Patent: Jan. 6, 2015

(54) RED EYE DETECTION AIDED BY FACE DETECTION

(75) Inventors: Boris Oicherman, Jerusalem (IL); Ran Waidman, Nes Ziona (IL); Matthew Gaubatz, Seattle, WA (US); Shlomo Harush, Nes Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 34 days.

(21) Appl. No.: 13/387,065

(22) PCT Filed: Oct. 19, 2009

(86) PCT No.: PCT/US2009/061126
§ 371 (c)(1),
(2), (4) Date: Feb. 15, 2012

(87) PCT Pub. No.: WO2011/049550
PCT Pub. Date: Apr. 28, 2011

(65) Prior Publication Data
US 2012/0134546 A1 May 31, 2012

(51) Int. Cl.
*G06K 9/00* (2006.01)
*G06T 7/00* (2006.01)
(52) U.S. Cl.
CPC ..... *G06T 7/0046* (2013.01); *G06T 2207/30216* (2013.01)
USPC ............ 382/117; 382/115; 382/116; 382/118
(58) Field of Classification Search
USPC .......... 382/103, 115–118, 190, 199, 225, 282
See application file for complete search history.

(56) References Cited

U.S. PATENT DOCUMENTS

| 6,895,112 | B2 * | 5/2005 | Chen et al. ............ 382/167 |
| 7,376,270 | B2 * | 5/2008 | Chen et al. ............ 382/167 |
| 2003/0053663 | A1 * | 3/2003 | Chen et al. ............ 382/117 |
| 2003/0202105 | A1 * | 10/2003 | Gaubatz et al. ...... 348/207.99 |
| 2004/0041924 | A1 * | 3/2004 | White et al. ........... 348/239 |
| 2005/0129288 | A1 * | 6/2005 | Chen et al. ............ 382/118 |
| 2005/0169520 | A1 * | 8/2005 | Chen et al. ............ 382/165 |
| 2005/0220347 | A1 * | 10/2005 | Enomoto et al. ....... 382/190 |
| 2008/0037838 | A1 * | 2/2008 | Ianculescu et al. .... 382/118 |
| 2008/0151186 | A1 * | 6/2008 | Adachi et al. ......... 351/206 |
| 2009/0103784 | A1 * | 4/2009 | Forutanpour .......... 382/117 |
| 2009/0226083 | A1 * | 9/2009 | Kim et al. ............. 382/164 |
| 2010/0172577 | A1 * | 7/2010 | Matsushita et al. ..... 382/165 |

OTHER PUBLICATIONS

Probabilistic automatic—correction, Williamowski et al., IEEE, 0-7695-2521-0, 2006, pp. 1-4.*
Probabilistic automatic red—correction, Willamowski et al., IEEE, 0-7695-2521-0, 2006, pp. 1-4.*

* cited by examiner

*Primary Examiner* — Jayesh A Patel
(74) *Attorney, Agent, or Firm* — Steven L Webb; Hewlett-Packard Development Company, L.P.

(57) ABSTRACT

A method for identifying a pair of genuine red eye artifacts in a captured image includes the steps of determining the presence of a face in the captured image, substantially encompassing the face within a shape, and determining the presence of three or more candidate red eye artifacts within the shape. The method continues with measuring the distance from an edge of the shape to each of the three or more candidate red eye artifacts and identifying, as genuine red eye artifacts, two candidate red eye artifacts of the three or more candidate red eye artifacts that are within a predetermined vertical distance from the edge of the shape.

8 Claims, 4 Drawing Sheets

RED EYE DETECTION AIDED BY FACE DETECTION

BACKGROUND

"Red eye" is the appearance of red pupils in a captured image that occurs when the face of a person is photographed under low ambient light. In particular, when the photographic flash is very close to the camera lens, light from the flash is reflected off the fundus at the back of the eyeball of the subject being photographed and back towards the camera. Red eye is a photographic effect that can make the eyes of a person being photographed look unnatural in the captured image. For this reason, many algorithms have been developed to detect the presence of red eyes in the captured image and to perform appropriate corrections so that the subject being photographed appears more natural in the image.

However, the possibility exists for a detection algorithm to mistakenly identify other red objects in the captured image as being a red eye and thus be in need of correction. To reduce the occurrence of these "false alarms", parameters of the detection algorithm may be modified so that, for example, red shapes that only approach the shape of a red eye are not falsely identified as such. However, a drawback of such a technique is that in the event that a genuine red eye artifact is present in the captured image, but perhaps does not meet each and every condition for being a genuine red eye artifact, the algorithm may incorrectly determine that a genuine red eye artifact is not present.

Embodiments of the invention described herein address the above-identified and other shortcomings of conventional red eye detection schemes.

DESCRIPTION OF THE EMBODIMENTS

Embodiments of the invention provide a capability to increase the likelihood of correctly identifying a pair of genuine red eye artifacts within a captured scene. Additionally, the likelihood of mistakenly identifying an arbitrary red object as a genuine red eye artifact is reduced. The inventors have determined that through the use of face detection, a technology that has come to fruition in recent years, a detected face in a captured image provides a context within which detection of a pair of genuine red eye artifacts can be reliably performed. The embodiments of the invention described herein can be used to augment any existing red eye detection algorithm by using geometrical characteristics common to virtually all human faces.

The inventors of the claimed invention have determined that it is rare that only a single genuine red eye artifact is present in the image. In the vast majority of instances, the unnatural phenomenon of red eye occurs at least in pairs in the captured image. For this reason, embodiments of the invention disclosed herein call attention to the detection of a pair of genuine red eye artifacts and the relationships that exist between the elements of the pair. The geometrical characteristics of the human face that surrounds the pair of genuine red eye artifacts in the captured image are also considered.

Figure 1:
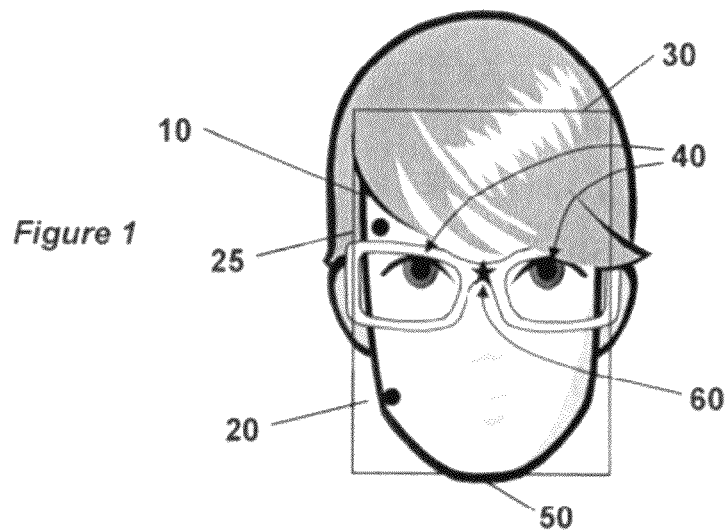
FIG. 1 represents a photograph of a face encompassed by a rectangle according to an embodiment of the invention.

FIG. 1 represents a photograph of a face encompassed by a rectangle according to an embodiment of the invention. Although a rectangle encompasses the human face of FIG. 1, nothing prevents the use of any other polygon or other shape to encompass face 10. In FIG. 1, the location of the subject's face (10) within a captured image has already been found using a face detection algorithm such as that provided in U.S. Pat. No. 7,099,510 entitled "Method and System for Object Detection in Digital Images" or as provided in numerous other patent applications and issued US and foreign patents.

Encompassing face 10 is rectangle 30 in which a narrow edge of the rectangle substantially coincides with chin 50 of face 10. Within face 10 are eyes 40, which have been colored black to represent flash-induced genuine red eye artifacts. Also present in face 10 are blemishes 20 and 25. At the bottom of rectangle 30, the subject's chin (50) can be seen as substantially coinciding with the bottom (narrow) edge of rectangle 30. FIG. 1 also shows reflection 60, which represents the reflection of a red light on the nose bridge of the subject's glasses.

When using a typical red eye detection algorithm, it is quite possible that blemishes 20 and 25, along with eyes 40 and 42, as well as reflection 60 would all be classified by the algorithm as genuine red eye artifacts. Accordingly, the algorithm may change the color of eyes 40 and 42 from red to a more naturally occurring color such as black or brown. The algorithm would likely also modify the colors of blemishes 20 and 25, thus making the blemishes on face 10 appear as blotches or moles. Finally, the algorithm would likely also change the color of reflection 60 to appear black or brown.

Figure 2:
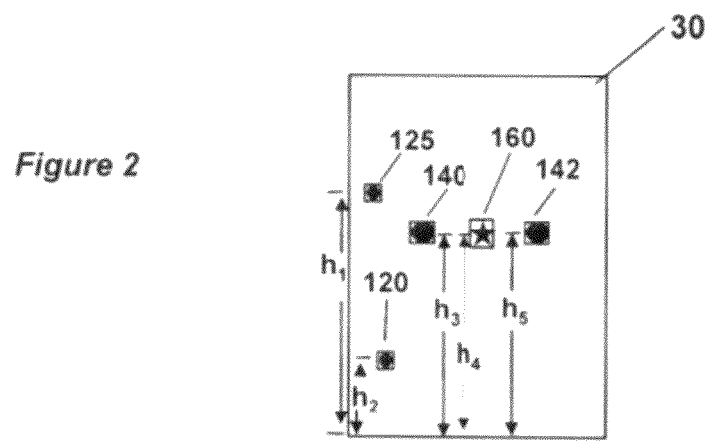
FIGS. 2-3 show the rectangle of FIG. 1 with boxes encompassing both red eyes, blemishes, and reflections according to an embodiment of the invention.

FIG. 2 shows rectangle 30 with candidate red eye artifact boxes 120, 125, 140, 142, and 160 encompassing both red eyes (40 and 42), both blemishes (20 and 25), and reflection (60) present on the subject's glasses according to an embodiment of the invention. In FIG. 2, candidate red eye artifact box 120 represents the smallest shape that can encompass blemish 20. In a similar manner, candidate red eye artifact boxes 125, 140, 142, and 160 represent the smallest shapes that can encompass blemish 25, eyes 40 and 42, and reflection 60, respectively. In the embodiment of FIG. 2, the shape encompassing the candidate red eye artifact boxes (120, 125, 140, 142, and 160) are shown as being squares. However, nothing prevents the use of any other shape, such as a trapezoid, triangle, and so forth, to include face 10 of FIG. 2.

Each of candidate red eye artifact boxes 120, 125, 140, 142, and 160 is shown as being positioned at a particular distance from the lower edge of rectangle 30. Candidate red eye artifact box 125 is located at a distance $h_1$ from the lower edge of the rectangle. Candidate red eye artifact box 120 is located at a distance $h_2$ from the lower edge of the rectangle. Candidate red eye artifact box 140 is located at a distance $h_3$ from the lower edge of the rectangle. Candidate red eye artifact box 142 is located at a distance $h_5$ from the lower edge of the rectangle. Candidate red eye artifact box 160 is located at a distance $h_4$ from the lower edge of the rectangle. In the embodiment of FIG. 2, each of dimensions $h_1$, $h_2$, $h_3$, $h_4$, and $h_5$ as well as the size of each of candidate red eye artifact boxes 120, 125, 140, 160, and 142 are used to aid or enhance the probability of the correct identification of genuine red eye artifacts from the larger set of candidate red eye artifacts.

Figure 3:
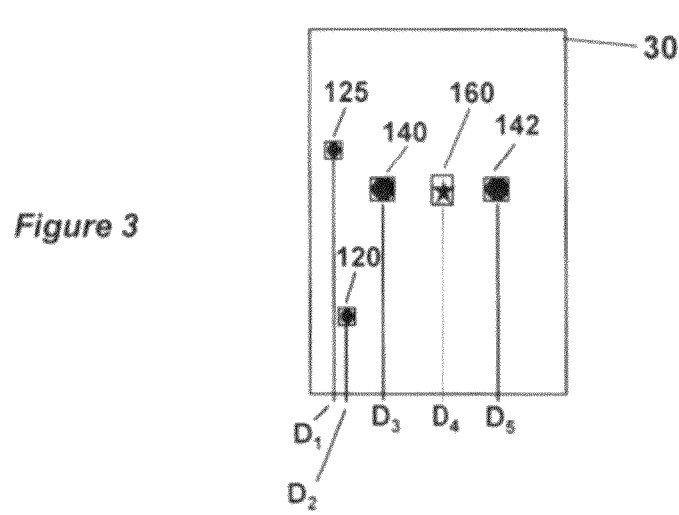

In the embodiment of FIG. 3 (which will be explained hereinafter), each candidate red eye artifact is analyzed using overlapping groups of two, with each group of two being compared with every other group of two candidate red eye artifacts. Thus, for the five candidate red eye artifacts of FIG. 2, grouping each candidate artifact in groups of two results in 10 comparisons being made (since 5!/2!=10). Accordingly, for the embodiment of FIG. 2, the following comparisons among the candidate red eye artifact boxes would be made:

1. Box 125 with box 120
2. Box 125 with box 140
3. Box 125 with box 142
4. Box 125 with box 160
5. Box 140 with box 142
6. Box 140 with box 120
7. Box 140 with box 160
8. Box 142 with box 160
9. Box 142 with box 120
10. Box 120 with box 160

In FIG. 2, the considerations that increase the likelihood that a pair of candidate red eye artifacts indeed represents genuine red eye artifacts in the captured image at least include the vertical distance (height) of the candidate artifact from the lower edge of rectangle 30. Thus, when the vertical distance of each candidate red eye artifact box is compared with that of every other box, a probability that a candidate red eye artifact is indeed a genuine red eye artifact is assigned to each comparison. Thus, in FIG. 2, the probability that candidate red eye artifact boxes 120 and 125 encompass genuine red eye artifacts is low based on their differing vertical distances from the lower edge of rectangle 30. However, when the vertical distances from the bottom of rectangle 30 to candidate red eye artifact boxes 140 and 142 are compared with each other, the probability that these represent a pair of genuine red eye artifacts is much higher. In a similar manner, when the vertical distances from the bottom of rectangle 30 to candidate red eye artifact boxes 140 and 160 are compared with each other, the probability that these represent a pair of genuine red eye artifacts is also higher. Finally, when the vertical distances from the bottom of rectangle 30 to boxes 160 and 142 are compared, the probability that these represent a pair of genuine red eye artifacts is also higher. In spite of this, as will be explained hereinafter, other considerations can be used to reduce the likelihood that reflection 60 (as surrounded by candidate red eye artifact box 160) is misidentified as a genuine red eye artifact.

In the embodiment of FIG. 2, the "color distance" (that is, the distance between two colors in a color space) between each candidate red eye artifact box is also measured to determine which of the candidate artifacts is a genuine red eye artifact. Given that the vast majority of human faces include eyes of nearly-identical color, by performing the 10 previously-mentioned comparisons, the two candidate red eye artifacts having the least color difference are most likely to indicate a pair of genuine red eye artifacts. Accordingly, based on color distance, boxes 140 and 142 may be the most likely to represent genuine red eye artifacts.

An additional comparison of the candidate red eye artifacts enclosed in the boxes of FIG. 2 can be made to assess the differences in area of each candidate artifact. Thus, when each of candidate red eye artifact boxes 120, 125, 140, 142, and 160 is compared with one another, it can be seen that, for example, boxes 140 and 120 are unlikely to represent a pair of genuine red eye artifacts given the differing areas of box 120 when compared with box 140. However, based on this consideration, boxes 140 and 142 are much more likely to represent a pair of genuine red eye artifacts given their similar areas.

FIG. 3 shows rectangle 30 with candidate red eye artifact boxes 120, 125, 140, 142, and 160 encompassing both red eyes, blemishes, and reflections according to an embodiment of the invention. In FIG. 3, the horizontal distances from a reference point, such as the lower left corner of rectangle 30, to each of candidate red eye artifact boxes 120, 125, 140, 142, and 160 are identified. In this embodiment, the measurements of the distances between each box and perhaps from each box to the reference point is used to increase the probability that a pair of genuine red eye artifacts is present within rectangle 30. Thus, in the example of FIG. 3, it can be seen that candidate red eye artifact boxes 125 and 120 are unlikely to represent a pair of genuine red eye artifacts due to their close proximity to each other in the horizontal dimension. However, boxes 140 and 142, given the horizontal distance between the two in relation to the size of rectangle 30, have a much higher probability of including a pair of genuine red eye artifacts.

When some or all of the above-identified factors have been considered, it is most likely that candidate red eye artifact boxes 140 and 142 include genuine red eye artifacts. These factors suggest that genuine red eye artifacts are most likely to be of similar height from the bottom edge of a detected face. These factors also suggest that elements of a pair of genuine red eye artifacts are likely to be of substantially identical color, to be of substantially equal area, and to have horizontal spacing between elements of the pair that is within well-defined limits. The inventors of the invention claimed herein have determined that by performing these comparisons, the number of occurrences in which pair of genuine red eye artifacts is incorrectly identified is reduced. Further, the use of these considerations significantly increases the likelihood of correctly determining a pair of genuine red eye artifacts from a group of candidate red eye artifacts.

Figure 4:
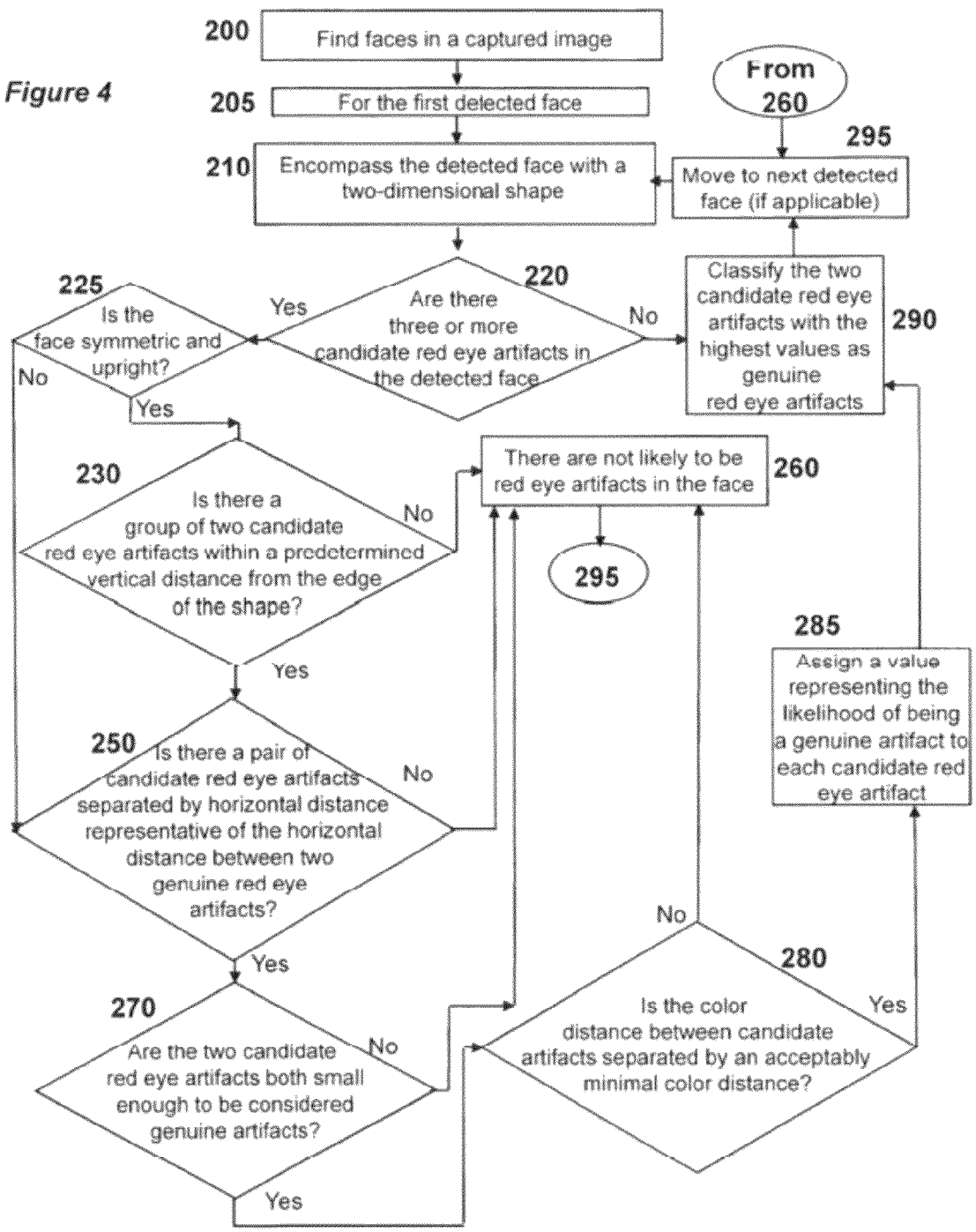
FIG. 4 is a flow chart for method of red eye detection aided by face detection according to an embodiment of the invention.

FIG. 4 is a flow chart for a method of red eye detection aided by face detection according to an embodiment of the invention. In the method of FIG. 4, a series of steps is performed to maximize the probability of the detection of a pair of genuine red eye artifacts from a group of 3 or more candidate red eye artifacts. However, nothing prevents fewer of the steps of FIG. 4 being performed in order to arrive at a reasonable probability that a pair of genuine red eye artifacts indeed exists in a captured image.

The method of FIG. 4 begins at step 200 in which a suitable image processing algorithm finds at least one face present in a captured image. As mentioned previously herein, finding faces within a captured image is a technique that has become well understood in recent years and may include techniques such as those described in U.S. Pat. No. 7,099,510 entitled "Method and System for Object Detection in Digital Images". The method continues at step 205 in which processing is focused on the first detected face. At step 210, a polygon, which might include a rectangle or other closed shape, is constructed (via computer) around the face detected in step 200. At step 220, a decision is made as to whether or not there are three or more candidate red eye artifacts present in the detected face. If the decision of step 220 indicates that there are less than three candidate red eye artifacts in the detected face, the method proceeds to step 290 in which the less than three candidate red eye artifacts are identified as genuine red eye artifacts. The method proceeds to step 295 in which the next face in the captured image is considered (if indeed another face in the image has been detected).

If the decision of step 220 indicates that there are three or more candidate red eye artifacts in the detected face, the method proceeds to step 225 and determines whether or not the face is upright and symmetric. If so, the face is designated as "regular". In the event that that the decision of this step indicates that the face is not regular, the method proceeds to step 250.

If the face is regular, the method proceeds to step 230 in which a determination is made as to whether there is a group of two candidate red eye artifacts within a predetermined vertical distance from the edge of the shape that encompasses the face detected in step 210. If the determination of step 230 indicates that there is indeed a group of two candidate red eye artifacts within a predetermined vertical distance from the edge of the shape, the method proceeds to step 250. In the event that the decision of step 230 indicates that there is not a group of two candidate red eye artifacts within a predetermined vertical distance of the edge of the shape, the method proceeds to step 260 in which a determination is made that there are not likely to be genuine red eye artifacts in the detected face. The method then proceeds to step 295 in which the next detected face is evaluated.

Returning now to step 250, the horizontal distance between candidate red eye artifacts is evaluated. In the event that the decision of step 250 indicates that there is not a pair of candidate artifacts separated by a horizontal distance representative of the horizontal distance between genuine red eye artifacts, step 260 is performed in which a determination is made that there are not likely to be genuine red eye artifacts in the detected face. After the decision of step 260 is made, the method returns to step 295 in which the next detected face is evaluated.

After step 250 has been performed, in which the horizontal distance between the candidate red eye artifacts is evaluated, step 270 is performed, in which a determination is made as to whether both candidate red eye artifacts encompass an area that is small enough in relation to the size of the rectangle (or other shape) to be consistent with a genuine red eye artifact. In the event that both candidates do not encompass an area that accords with the size of a genuine red eye artifact, the method again reverts to step 260 in which a determination is made that there are unlikely to be genuine red eye artifacts present in the detected face. The method then proceeds to step 295 in which the next detected face is evaluated.

In the event that the decision of step 270 indicates that both candidate red eye artifacts encompass an area small enough to be considered the size of a genuine red eye artifact, step 280 is performed in which the color distance between candidate red eye artifacts is evaluated. In the event that the decision of step 280 indicates that, indeed, there is a pair of candidate red eye artifacts with enough similarity in color, step 285 is performed to assign a likelihood that each candidate red eye artifact is a genuine red eye artifact. Step 290 is then performed in which the two most likely candidate red eye artifacts are classified as genuine red eyes. After the performance of step 290, an appropriate red eye correction algorithm can be performed on the candidate red eye artifacts most likely to be genuine red eye artifacts. In the event that there is not a pair of candidate artifacts with enough similarity in color, step 260 is performed in which the candidate red eye artifacts are determined as not being likely to represent red eyes. Control of the method then continues at step 295 in which another detected face is evaluated.

In some embodiments of the invention, a method for identifying a pair of genuine red eye artifacts in a captured image may only include the steps of determining the presence of a face in the captured image (such as in step 200), substantially encompassing the face within a shape (such as in step 210), determining the presence of three or more candidate red eye artifacts within the shape (such as in step 220), measuring the distance from an edge of the shape to each of the three or more candidate red eye artifacts (such as in step 230), and identifying, as genuine red eye artifacts, two candidate red eye artifacts of the three or more candidate red eye artifacts that are within a predetermined vertical distance from the edge of the shape.

Figure 5:
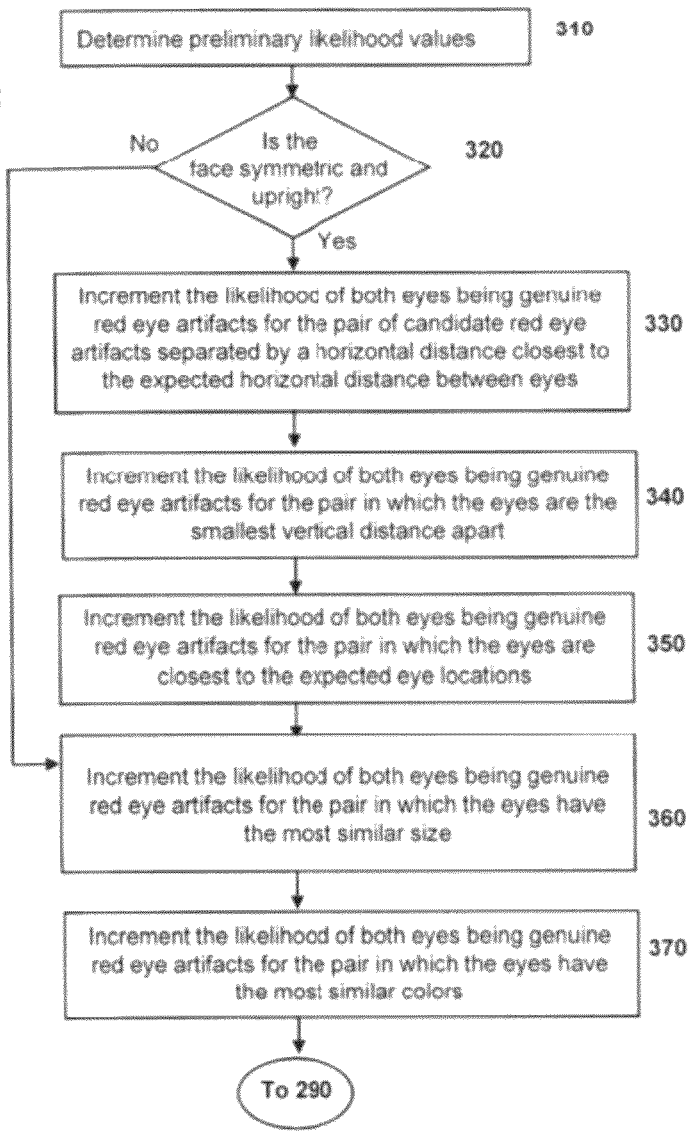
FIG. 5 is a flow chart for a method of accumulating probabilities that a particular pair of candidate red eye artifacts is indeed representative of genuine red eye artifacts in accordance with the example of FIG. 4.

FIG. 5 is a flow chart for a method of summing incremental probabilities that a pair of candidate red eye artifacts is indeed representative of genuine red eye artifacts in accordance with the example of FIG. 4. The method of FIG. 5 begins at step 310 in which the preliminary likelihood values corresponding to each of the decision blocks of FIG. 4 are determined. The inventors contemplate that by allowing the preliminary likelihood values to vary across test data sets (wherein each data set might include thousands of photographs having genuine red eye artifacts), the likelihood of correctly identifying a pair of candidate red artifacts as genuine red eye artifacts, without misidentifying genuine red eye artifacts, can be optimized. At the conclusion of FIG. 5, the incremented likelihood values associated with genuine red eye artifacts present in a particular captured image are used in step 290 of FIG. 4 to classify the two candidate red artifacts with the highest likelihoods as being genuine red eye artifacts.

After determining preliminary likelihood values (in step 310) step 320 is performed. In step 320, a determination is made as to whether a detected face (such as detected in step 200 of FIG. 4) is symmetric and upright. In the event that the detected face is not symmetric and upright (i.e., is not "regular"), the method continues at step 330 in which the horizontal distance closest to an expected horizontal distance between genuine red eye artifacts is evaluated. The likelihoods that the two candidate red eye artifacts separated by the horizontal distance that is closest to the expected horizontal distance represent genuine red eye artifacts are incremented. The method continues at step 340 in which the vertical distance between the candidate red eye artifacts is evaluated. The likelihoods that the two candidate artifacts separated by the minimal vertical distance represent genuine red eye artifacts are incremented.

The method continues at step 350 in which the locations of the candidate red eye artifacts are evaluated. The likelihoods that the two artifacts that appear closest to expected eye locations represent genuine red eye artifacts are incremented. The method continues at step 360 in which the areas of the candidate red eye artifacts are evaluated. The likelihoods that the two artifacts closest in size represent genuine red eye artifacts are incremented. The method continues at step 370 in which the colors of the candidate red eye artifacts are evaluated. The likelihoods that the two artifacts closest in color are genuine red eye artifacts are incremented. The method then proceeds to step 290, in which the two candidate red artifacts having the highest likelihood of being genuine red eye artifacts are conveyed to step 290 of FIG. 4.

The methods of FIGS. 4 and 5 can be performed using a variety of types of processors that might be embedded in digital cameras, printers, desktop computers, laptop computers, and so forth. But regardless of the particular computing platform used to perform embodiments of the invention that identify a pair of genuine red eye artifacts in a captured image, the inventors contemplate that the software and/or firmware logic module used to perform these embodiments would likely include logic for determining that at least one face is present in the captured image, logic for encompassing each one of the at least one face in a two-dimensional shape (such as a polygon), logic for determining that three or more candidate red eye artifacts are present in at least one of the two-dimensional shapes, and logic for determining that two red eye artifacts are among the three or more candidate red eye artifacts present in at least one of the two-dimensional shapes based on relative positions of the two genuine red eye artifacts within the two-dimensional shape.

In some embodiments of the invention, the relative positions of the two genuine red eye artifacts (as mentioned above) implies that the two genuine red eye artifacts are each located at a comparable vertical distance from a lower edge of the two-dimensional shape. Additionally, the relative positions may also imply that a first of the two genuine red eye artifacts is separated from a second of the two genuine red eye artifacts by a horizontal distance that is within predetermined limits.

In some embodiments of the invention, the logic module mentioned above may also include logic for determining that a first of the two genuine red eye artifacts is of a color comparable to that of a second of the two genuine red eye artifacts. The module may also include logic for determining that a first of the two genuine red eye artifacts is of an area comparable to that of a second of the two genuine red eye artifacts.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for identifying a pair of genuine red eye artifacts in a captured image, comprising:
    determining the presence of a face in the captured image;
    substantially encompassing the face within a rectangular shape;
    determining the presence of three or more candidate red eye artifacts within the rectangular shape;
    identifying, as genuine red eye artifacts, two candidate red eye artifacts of the three or more candidate red eye artifacts by:
        measuring a color distance between each of the three or more candidate red eye artifacts within the rectangular shape;
        measuring, for each of the three or more candidate red eye artifacts, a vertical distance therefrom to a bottom edge of the rectangular shape and determining whether a group of candidate red eye artifacts of the three or more candidate red eye artifacts that are each within a predetermined vertical distance of the bottom edge of the rectangular shape exists;
        after and in response to determining that the group exists, measuring a horizontal distance between each pair of candidate red eye artifacts of the group and determining whether a pair of candidate red eye artifacts of the group separated by a predetermined horizontal distance exists; and
        in response to determining that the pair of candidate red eye artifacts of the group separated by the predetermined horizontal distance exists, setting the pair of candidate red eye artifacts as the genuine red eye artifacts.

2. The method of claim 1, wherein the bottom edge of the rectangular shape corresponds to a narrow side of the rectangle, wherein the narrow side of the rectangle substantially coincides with the chin of the face.

3. The method of claim 1, further comprising comparing an area of a first of the three or more candidate red eye artifacts with an area of the second of the three or more candidate red eye artifacts.

4. A logic module for identifying a pair of red eye artifacts in a captured image, comprising:
    hardware, including a processor;
    logic implemented at least by the hardware for determining that at least one face is present in the captured image;
    logic implemented at least by the hardware for encompassing each one of the at least one face in a two-dimensional rectangular shape;
    logic implemented at least by the hardware for determining that three or more candidate red eye artifacts are present in the two-dimensional shape;
    logic implemented at least by the hardware for determining two genuine red eye artifacts within the rectangular two-dimensional shape by:
        measuring a color distance between each of the three or more candidate red eye artifacts within the rectangular two-dimensional shape;
        measuring, for each of the three or more candidate red eye artifacts, a vertical distance therefrom to a bottom edge of the rectangular two-dimensional shape and determining whether a group of candidate red eye artifacts of the three or more candidate red eye artifacts that are each within a predetermined vertical distance of the bottom edge of the rectangular two-dimensional shape exists;
    after and in response to determining that the group exists, measuring a horizontal distance between each pair of candidate red eye artifacts of the group and determining whether a pair of candidate red eye artifacts of the group separated by a predetermined horizontal distance exists; and
    in response to determining that the pair of candidate red eye artifacts of the group separated by the predetermined horizontal distance exists, setting the pair of candidate red eye artifacts as the genuine red eye artifacts.

5. The logic module of claim 4, further comprising logic for determining that a first of the two genuine red eye artifacts is of a color comparable to that of a second of the two genuine red eye artifacts.

6. The logic module of claim 4, further comprising logic for determining that a first of the two genuine red eye artifacts is of an area comparable to that of a second of the two genuine red eye artifacts.

7. The logic module of claim 4, wherein the bottom edge of the rectangular two-dimensional shape corresponds to a narrow side that substantially coincides with the chin of the at least one face present in the captured image.

8. The logic module of claim 4, wherein the logic for determining that two red eye artifacts are among the three or more candidate red eye artifacts present includes logic for assigning a probability to each of the candidate red eye artifacts, wherein the probability pertains to the likelihood that the candidate red eye artifact is a red eye artifact.

* * * * *